United States Patent
Lee et al.

(10) Patent No.: US 9,607,421 B2
(45) Date of Patent: Mar. 28, 2017

(54) DISPLAYING PARTICLE EFFECT ON SCREEN OF ELECTRONIC DEVICE

(71) Applicant: Samsung Electronics Co., Ltd., Gyeonggi-do (KR)

(72) Inventors: Jae Myoung Lee, Seoul (KR); Gyu Chual Kim, Gyeonggi-do (KR); Hyung Min Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/589,507

(22) Filed: Jan. 5, 2015

(65) Prior Publication Data

US 2015/0193951 A1    Jul. 9, 2015

(30) Foreign Application Priority Data

Jan. 3, 2014    (KR) ........................ 10-2014-0000791

(51) Int. Cl.
*G06T 13/80*    (2011.01)
*G06F 3/0488*   (2013.01)

(52) U.S. Cl.
CPC .......... *G06T 13/80* (2013.01); *G06F 3/04883* (2013.01); *G06T 2210/56* (2013.01)

(58) Field of Classification Search
None
See application file for complete search history.

(56) References Cited

U.S. PATENT DOCUMENTS

| | | | |
|---|---|---|---|
| 8,472,671 B2 | 6/2013 | Kubota | |
| 2006/0117197 A1* | 6/2006 | Nurmi | G06F 1/3215 713/323 |
| 2011/0043826 A1* | 2/2011 | Kiyose | G01B 11/03 356/614 |
| 2011/0069018 A1* | 3/2011 | Atkins | G06F 3/0416 345/173 |
| 2012/0045094 A1 | 2/2012 | Kubota | |
| 2014/0115690 A1* | 4/2014 | Huang | G06F 3/0488 726/16 |

* cited by examiner

*Primary Examiner* — Ashish K Thomas
(74) *Attorney, Agent, or Firm* — The Farrell Law Firm, P.C.

(57) ABSTRACT

Methods and electronic devices for displaying a particle effect are described. One method includes receiving an input on an area of a display screen, the area having a color. A main particle color is set based on the color, and then a secondary particle color is set based on the main particle color. A plurality of moving particles are displayed, the moving particles moving around the input area, and each of the plurality of moving particles has a color on a spectrum from the main particle color to the secondary particle color.

16 Claims, 10 Drawing Sheets

DISPLAYING PARTICLE EFFECT ON SCREEN OF ELECTRONIC DEVICE

PRIORITY

This application claims priority under 35 U.S.C. §119(a) to a Korean Patent Application filed on Jan. 3, 2014 in the Korean Intellectual Property Office and assigned Serial No. 10-2014-0000791, the entire content of which is incorporated herein by reference.

BACKGROUND

1. Field of the Invention

The present invention relates generally to a particle effect displayed on the screen of an electronic device.

2. Description of Related Art

With the recent development of digital technology, various electronic devices that are capable of communication and processing personal information on the move, such as mobile communication terminals, Personal Digital Assistants (PDAs), electronic notes, smart phones, and tablet Personal Computers (PCs) have been released. Such electronic devices do not remain confined to their respective traditional unique areas but are attaining a mobile convergence in which they include areas for other terminals.

Typically, an electronic device includes call functions such as voice calls and video calls, message transmission/reception functions such as Short Message Services (SMS)/Multimedia Message Service (MMS) and e-mail services, electronic note functions, imaging functions, broadcast playback functions, moving picture playback functions, music playback functions, internet functions, messenger functions, and Social Networking Service (SNS) functions.

With the development of functions related to the User Interface (UI) or User eXperience (UX) of the electronic device, various effects are being provided for the execution of an application or the switching of a screen.

A typical electronic device does not provide any effect in response to a user input. When a user performs an input operation on the touch screen of the electronic device, according to the input operation, a screen corresponding to another page or switching to another application is provided, but there is no effect on the input itself.

SUMMARY

The present invention has been made to solve the above-mentioned problems and disadvantages, and to provide at least the advantages described below. Accordingly, an aspect of the present invention provides a method of displaying a particle effect on a screen of an electronic device.

According to an aspect of the present invention, a method of displaying a particle effect on an electronic device is provided. The method includes receiving an input on an area on a display screen of the electronic device, the input having a duration, a pressure intensity, a gesture type, and an input tool; setting, based on at least one of the input duration, pressure, gesture type, and input tool, at least one of a range of moving particle sizes, a number of moving particles, one or more moving particle shapes, and a duration of each moving particle; and generating a plurality of moving particles on the display screen, the moving particles moving around the input area, wherein the plurality of moving particles has at least one of the set number of moving particles, the set range of moving particle sizes, the set one or more moving particle shapes, and the set duration of each moving particle.

According to another aspect of the present invention, a method for an electronic device is provided, including receiving an input on an area on a display screen of the electronic device, the input having a duration, a pressure intensity, a gesture type, and an input tool; setting, based on at least one of the input duration, pressure, gesture type, and input tool, at least one of a range of moving particle sizes, a number of moving particles, one or more moving particle shapes, and a duration of each moving particle; and generating a plurality of moving particles on the display screen, the moving particles moving around the input area, wherein the plurality of moving particles has at least one of the set number of moving particles, the set range of moving particle sizes, the set one or more moving particle shapes, and the set duration of each moving particle.

According to still another aspect of the present invention, an electronic device for displaying a particle effect is provided. The device includes a display screen; a touch input unit; and one or more processors, the one or more processors capable of performing the steps of when an input is received on an area on the display screen, the area having at least one color, setting a main particle color based on one or more of the at least one color; setting a secondary particle color based on the main particle color; and generating a plurality of moving particles on the display screen, the moving particles moving around the input area, wherein each of the plurality of moving particles has a color on a spectrum from the main particle color to the secondary particle color.

According to still another aspect of the present invention, an electronic device for providing a particle effect is provided. The device includes a display screen; a touch input unit; and one or more processors, the one or more processors capable of performing the steps of: when an input is received on an area on the display screen, the input having a duration, a pressure intensity, a gesture type, and an input tool, setting, based on at least one of the input duration, pressure, gesture type, and input tool, at least one of a range of moving particle sizes, a number of moving particles, one or more moving particle shapes, and a duration of each moving particle; and generating a plurality of moving particles on the display screen, the moving particles moving around the input area, wherein the plurality of moving particles has at least one of the set number of moving particles, the set range of moving particle sizes, the set one or more moving particle shapes, and the set duration of each moving particle.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
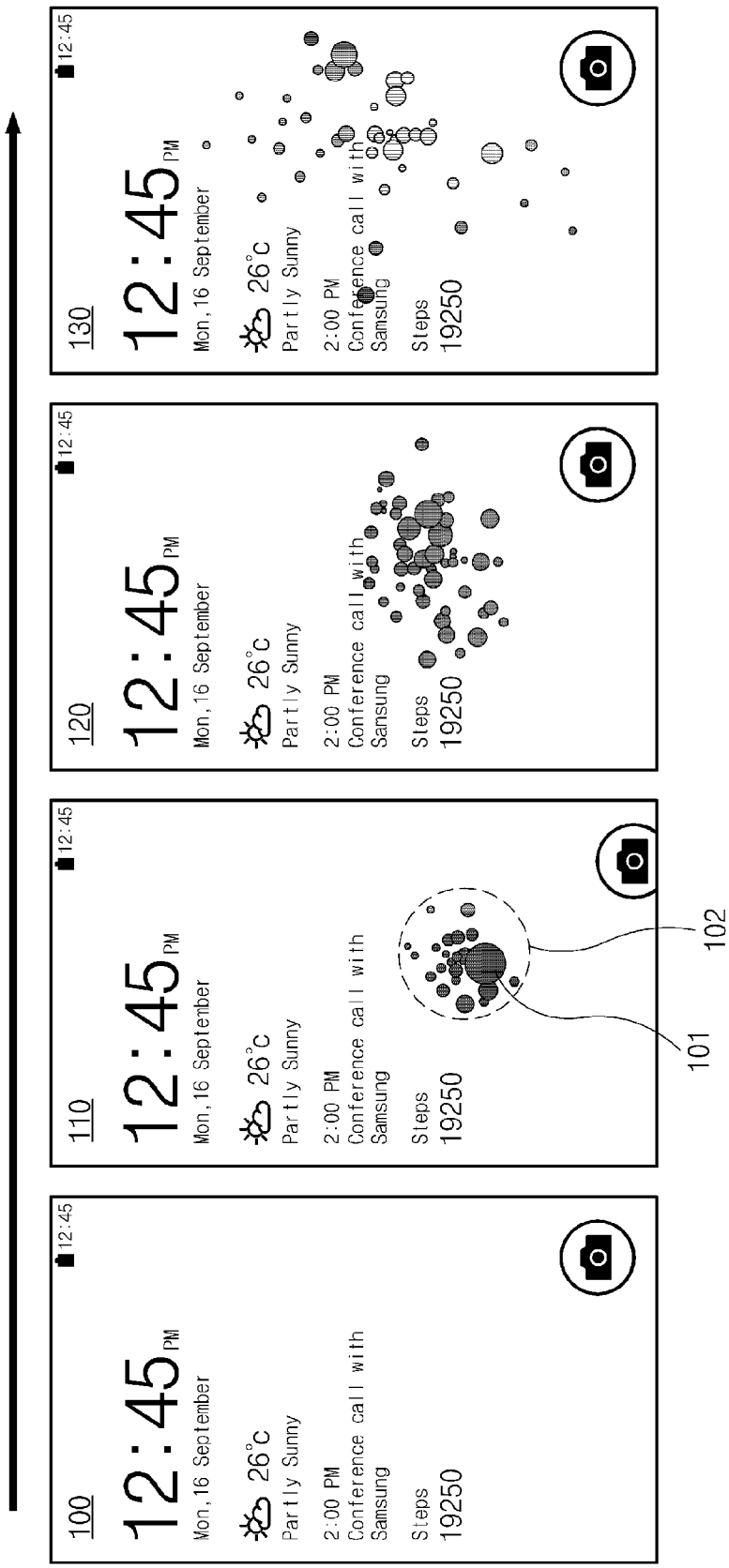
FIG. 1 is an illustration of a screen to which a particle effect is applied according to an embodiment of the present invention.

Various embodiments of the present invention are described below in conjunction with the accompanying drawings. Since various embodiments of the present invention may have various modifications, embodiments of the present invention are illustrated in the drawings and related detailed descriptions are disclosed herein. However, the present invention is not intended to be limited to the embodiments and it should be understood that the present invention covers all modifications, equivalents, and/or replacements that fall within the spirit and technical scope of the present invention. In the drawings, similar components are denoted using similar reference numerals.

The expressions "include" or "may include" in various embodiments of the present invention indicate the presence of a disclosed corresponding function, operation and/or component but does not exclude one or more functions, operations or components in addition. Furthermore, it should be understood that the terms "includes" or "has" in various embodiments of the present invention indicate the presence of characteristics, numbers, steps, operations, components, parts or combinations thereof represented in the present disclosure but do not exclude the presence or addition of one or more other characteristics, numbers, steps, operations, components, parts or combinations thereof.

The expressions "or" or "at least one of A and/or B" in various embodiments of the present invention include any and all combinations of enumerated words. For example, the expressions "A or B" or "at least one of A and/or B" may include A, B, or both A and B.

The expressions "a first", "a second", "firstly", or "secondly" in various embodiments of the present invention may modify various components of the present invention but do not limit corresponding components. For example, the expressions above do not limit the order and/or importance of corresponding components. The expressions above may be used to distinguish one component from another component. For example, both a first user device and a second user device are user devices that are mutually different user devices. For example, without departing from the scope of the present invention, a first component may be referred to as a second component and similarly, the second component may also be referred to as the first component.

When any component is referred to as being "connected" to another component, it should be understood that the former can be "directly connected" to the latter, or there may be another component in between. On the contrary, when any component is referred to as being "directly connected" to another component, it should be understood that there may be no other component in between.

The terms used herein are used only to describe embodiments of the present invention and are not intended to limit the present invention. The terms in singular form may include the plural form unless otherwise specified.

Unless otherwise defined herein, all terms used herein including technical or scientific terms have the same meanings as those generally understood by a person skilled in the art. Terms defined in generally used dictionaries should be construed to have meanings matching contextual meanings in the related art and should not be construed as having an ideal or excessively formal meaning unless otherwise defined herein.

An electronic device according to an embodiment of the present invention may be a device that includes a communication function. For example, the electronic device may include at least one of a smart phone, a tablet Personal Computer (PC), a mobile phone, a video phone, an e-book reader, a desktop PC, a laptop PC, a net book computer, a Personal Digital Assistant (PDA), a Portable Multimedia Player (PMP), a Motion Picture Experts Group Audio Layer 3 (MP3) player, a mobile medical device, a camera, and a wearable device (e.g., a Head-Mounted-Device (HMD) such as electronic glasses, electronic clothing, an electronic bracelet, an electronic necklace, an electronic accessory, an electronic tattoo, or a smart watch).

According to an embodiment of the present invention, the electronic device may be a smart home appliance having a communication function. The smart home appliance may include, for example, at least one of a television (TV) set, a Digital Video Disk (DVD) player, an audio set, a refrigerator, an air conditioner, a cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic frame.

According to an embodiment of the present invention, the electronic device may include at least one of various medical devices (e.g., a Magnetic Resonance Angiography (MRA) device, a Magnetic Resonance Imaging (MRI) device, a Computed Tomography (CT) device, a camera, and an ultrasonicator), a navigator, a Global Positioning System (GPS) receiver, an Event Data Recorder (EDR), a Flight Data Recorder (FDR), a car infotainment device, electronic equipment for a ship (e.g., a navigator for a ship or a gyro compass), avionics, a security device, a head unit for a car, an industrial or home robot, a financial institution's Automated Teller Machine (ATM) or a store's Point Of Sales (POS).

According to an embodiment of the present invention, the electronic device may include at least one of a portion of a building/structure or furniture including a communication function, an electronic board, an electronic signature receiving device, a projector, and various measurement devices (e.g., a water, electricity, gas or electric wave measurement device). An electronic device according to an embodiment of the present invention may be one or more combinations of the above-described various devices. Moreover, an electronic device according to an embodiment of the present invention may be a flexible device. Moreover, it is obvious to a person skilled in the art that an electronic device according to an embodiment of the present invention is not limited to the above-described devices.

An electronic device according to an embodiment of the present invention is described below with reference to the accompanying drawings. The term "user" used in an embodiment of the present invention may refer to a person who uses an electronic device or a device (e.g., an electronic device having artificial intelligence) that uses an electronic device.

FIG. 1 is an illustration of a screen to which a particle effect is applied according to an embodiment of the present invention.

Referring to FIG. 1, a screen 100 represents the initial screen of a typical electronic device. The screen 100 may be provided in a locked state or in an unlocked home screen state.

When a user touches any area of the screen 100, particles are created and start moving about, around, and/or near the touched point. For example, when a user touches an area 101 on a screen 110, a plurality of moving particles 102 is displayed around the area 101. In one embodiment, the area 101 touched by a user is displayed with a certain color. However, in another embodiment of the present invention, no mark may be displayed on the area 101 touched by the user and only the plurality of moving particles 102 is displayed.

A user input may be a touch of a finger. In general, the touch input occurs when a finger is in physical contact with the display panel of an electronic device. However, according to a characteristic supported by the display panel or the electronic device, the user input (e.g., hovering) presented in an embodiment of the present invention may also be implemented while there is no contact. For example, when a finger is within a certain distance from the screen, the electronic device may determine whether a touch input occurred, by e.g. detecting a variation in magnetic field caused by the finger. Alternatively, when a stylus such as an S-pen approaches the screen, the electronic device may determine that there is a touch input.

In an embodiment of the present invention, when an input tool or unit such as a finger or an S-pen is within a reference distance from the screen, the electronic device displays a mark such as an area 101. In this example, the area 101 corresponds to a point on the screen indicated by the finger or the S-pen. The electronic device also creates the plurality of moving particles 102 in this state, or create the plurality of moving particles 102 from when a physical touch input (e.g., contact) actually occurs.

The particles 102 are created only when the touch input occurs. For example, on a screen 120 where the touch input ends, pre-created particles 102 move according to a defined rule or randomly and additional new particles are not created. As shown on screen 130, as time elapses, particles are dispersed, become unclear, and eventually disappear from the screen.

Figure 2:
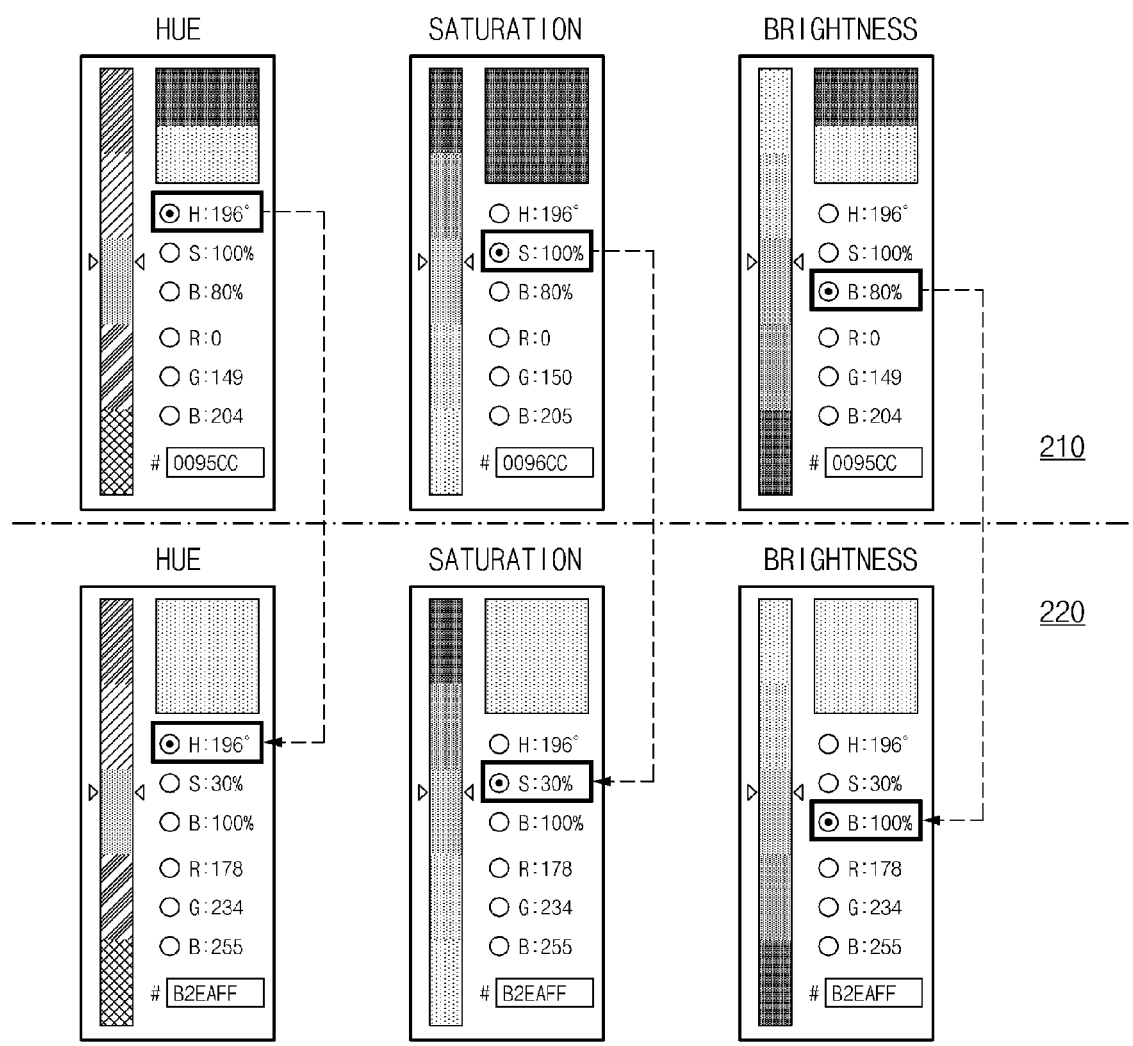
FIG. 2 is an illustration of a screen for determining a color according to an embodiment of the present invention.

FIG. 2 is an illustration of a screen for determining a color according to an embodiment of the present invention. An area 210 shows information on a main color, and an area 220 shows information on a secondary color.

When a user input is received on a point of a screen, color information on the point is obtained. For example, Hue, Saturation, and Brightness (HSB) values of the corresponding point are extracted. The brightness B of the HSB may be replaced with a value V (i.e. HSV). The hue H means a relative arrangement angle when red, having the longest wavelength, on a hue circle or color wheel where the visible spectrum is arranged in a ring shape is 0°. Thus, the hue H value has a range from 0° to 360°. For reference, both 0° and 360° mean red. The saturation S represents a relative level of darkness when the darkest state of a certain color is 100%. Thus, a saturation S value is within a range from 0% to 100% and the saturation S value being 0% means an achromatic color having the same brightness B. The brightness B represents a level of brightness where white is 100% and black is 0%.

In addition to the HSB, a color space or color system such as Cyan-Magenta-Yellow (CMY), or Red, Green and Blue (RGB) may be used. CMY corresponds to cyan, magenta and yellow, respectively. CMY is one of the color space models replacing RGB and creates a desired color by decreasing the ratios of cyan C, magenta M, and yellow Y from white. When there are no cyan C, magenta M, and yellow Y due to the decrease, black appears, and when there is no decrease, white is maintained.

RGB is a color expression technique that uses red, green and blue, wherein each component of RGB has a value between 0 and 255. For example, red has a value corresponding to (R, G, B)=(255, 0, 0).

Various embodiments of the preset invention are described by mainly using the HSB color system but may also be applied to a color space such as an RGB, CMY, CMYK (i.e., CMY plus black), sRGB (i.e., standard RGB), or Lab color space, through various modifications, as would be understood by a person skilled in the art.

A point on a screen which receives a user input includes one color in an embodiment of the present invention, but various colors may be present on an area corresponding to a user input point, according to an image currently displayed on the screen of an electronic device. In this case, it is possible to extract an HSB value for the average color of a corresponding point, a color corresponding to the central point of the corresponding point, or any color that is included in the corresponding area. The extracted HSB value is determined to be a main color. For example, as shown in the area 210 of FIG. 2, a color value corresponding to H=196, S=100, and B=80 is to be a main value.

A secondary color is determined based on the extracted HSB value. The secondary color may have the same hue H value as the main color. The saturation S value of the secondary color may be decreased compared to the saturation S value of the color. For example, as shown in the area 220 of FIG. 2, the saturation value is decreased from 100 to 30. The decrease level is merely an example and may be adjusted to any percentage.

The brightness B value of the secondary color may be increased compared to the brightness B value of the main color. The brightness B value of the secondary color may increase to 100% irrespective of the brightness B value of the main color. Such an increased level is also exemplary and may be adjusted to any percentage.

In one embodiment, the electronic device determines the main color and the secondary color, sets the main color and the secondary color as the start and end points of gradation respectively, and displays, on the screen, a plurality of particles having any color between the main color and the secondary color. In this case, a white color and a black color may be changed by about 50% in terms of only a brightness B value. For example, white may be created within a range from 100% to 50% and black may be created within a range from 0% to 50%. In this case, a point where the plurality of particles are created may be the user input point. Created particles take the user input point as a starting point, move freely or according to a certain rule to be described below, and then vanish.

In an embodiment of the present invention, a color value is defined based on the HSB value. In an embodiment of the present invention, when being defined based on RGB according to a display panel or technique used for a device, or the setting of an operating system loaded on the device, this may be improper for a particle effect since the value of a gradation width randomly varies depending on brightness or saturation. In an embodiment of the present invention, the color of a particle is determined using an RGB or CMY value. In this case, it is also possible to use an RGB value converted based on the HSB value. For example, the electronic device may determine the main color and the secondary color based on the extracted HSB value, and convert HSB values corresponding to the main color and the secondary color respectively into RGB colors. That is, a color corresponding to any value between a value obtained by converting the main color HSB into RGB and a value obtained by converting the secondary color HSB into RGB may be displayed on the screen of the electronic device in response to a user input.

When a user input to one point on the screen of the electronic device is received, the electronic device generates a plurality of particles having any color within a range determined based on color information on the one point. The particles are continuously created at a certain percentage while a user input is maintained. For example, the electronic device generates particles at a ratio of 75 particles per 10 frames in an embodiment of the present invention while the user input is maintained.

In some embodiments of the present invention, the electronic device determines a time period during which an input lasts, and creates particles in proportion to the input time period. In other embodiments of the present invention, the electronic device includes a touch panel and uses a pressure-sensitive recognition technique to determine the intensity of pressure when the user touches the screen, and creates particles in proportion to the input intensity. In yet other embodiments, particles are created based on both the input time period and the input intensity. In still other embodiments, the size, the lifecycle (i.e., duration), the shape, the movement, and/or the color of one or more of the particles may be based on at least one of the user input duration, user input intensity, type of input device (e.g., finger, stylus, etc.), type of input gesture (drag, touch, slide, tap, etc.), and/or whether the input makes direct contact or is contactless. Moreover, any of the size, the lifecycle (i.e., duration), the shape, the movement, and/or the color of one or more of the particles may be set by the manufacturer, set by the user, selected according to a rule, and/or selected randomly.

In an embodiment of the present invention, created particles have various sizes. For example, the smallest particle may be defined as a circle having a diameter of 5 dots per inch (dpi) and the largest particle may be defined as a circle having a diameter of 50 dpi. However, such a size is merely an example and the particles may have various sizes according to a setting.

In an embodiment of the present invention, particles having various shapes in addition to various sizes are created. Although the particles created in FIG. 1 have a circular shape, particles may also be triangular or quadrilateral or have a star or snowflake shape. The particles may also have a three dimensional (3D) structure such as a hexahedron in addition to a polygon.

The shape of the particle may vary depending on a user input attribute. For example, the shape of a particle when the user input uses a human body part such as a finger may be different from that when an S-pen is used. The shape of a particle when a stylus is within a certain distance from a screen without contact may be different from that when an input unit is in physical contact with the screen. The shape of the created particle may vary depending on whether the current user input is a touch in a stopped state, a touch in a drag state, a touch in a double-tapping state, or a touch in a state where a plurality of points are together touched (e.g., mufti-touch state). According to such a touch attribute, a touch particle having any one of e.g., a circle, a triangle, and a quadrilateral may be created. Also, each particle may be destroyed after a certain time elapses from the time the particle was created (i.e., its creation time). As stated above, the size, the lifecycle (i.e., duration), the shape, the movement, and/or the color of one or more of the particles may be based on at least one of the user input duration, user input intensity, type of input device (e.g., finger, stylus, etc.), type of input gesture (drag, touch, slide, tap, etc.), and/or whether the input makes direct contact or is contactless.

Figure 3:
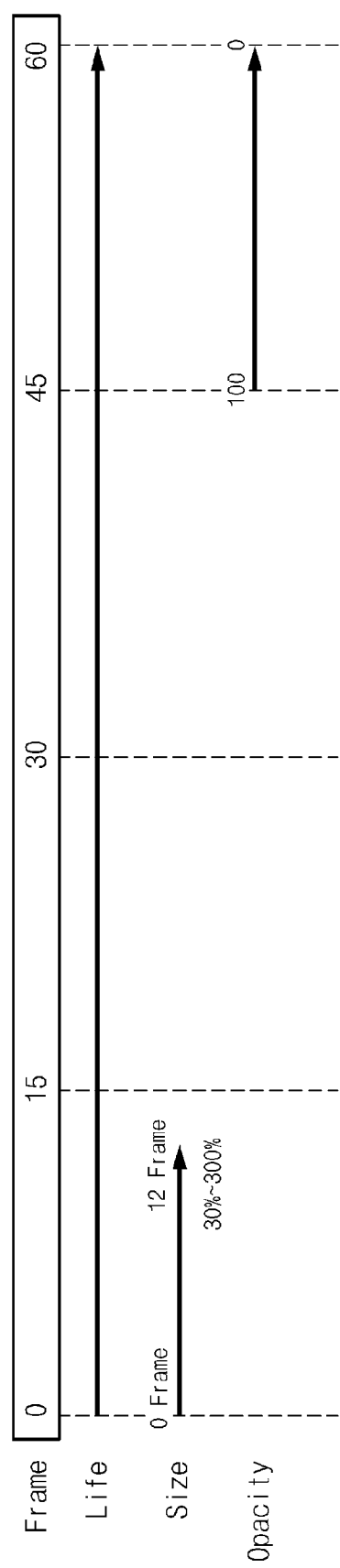
FIG. 3 is an illustration of a life cycle of a created particle according to an embodiment of the present invention.

FIG. 3 is an illustration of a life cycle of a created particle according to an embodiment of the present invention.

Referring to FIG. 3, a particle has a lifecycle of 60 frames. The particle has a size corresponding to 30% to 300% of a reference size for the first 12 frames and then moves freely or according to a certain rule. Opacity of the particle decreases after the 45th frame (i.e., the particle gradually becomes transparent) and is no longer displayed after the 60th frame.

The frame values shown in FIG. 3 are exemplary and the overall life time of a particle may be different. For example, the particle may have a lifecycle of 1 second, be created for the first 100 ms, move for the next 500 ms, and disappear for the last 400 ms as transparency increases.

For example, when 75 particles are created for every 10 frames and each particle has a lifecycle of 60 frames, a total of 375 particles are created if a user touches a screen for 50 frames, and a total of 110 frames (i.e., 50 frames+60 frames) elapses from the creation time of the first particle to the destruction time of the last particle.

Figure 4:
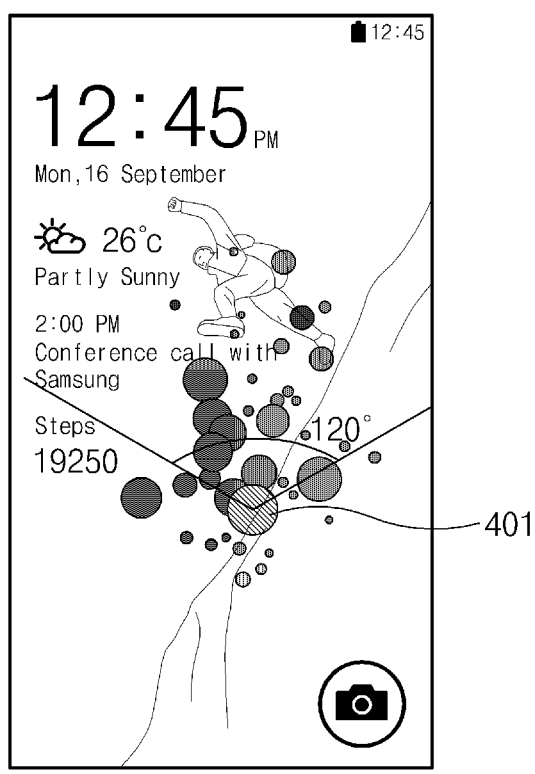
FIG. 4 is an illustration of the travel direction of a created particle according to an embodiment of the present invention.

FIG. 4 is an illustration of the travel direction of a created particle according to an embodiment of the present invention.

Referring to FIG. 4, most of the created particles have an initial direction within a range of 120° from a user input point 401. For example, 80% of the created particles may start moving at the initial velocity within a range of 120° toward the upper part of the screen from the user input point 401. Remaining particles that are 20% of the created particles may start moving at the initial velocity within a range exceeding 120°. The above-described angle and percentage are examples and, in an embodiment of the present invention, may vary. For example, 90% of created particles may start moving at any initial velocity within a range of 180° toward the upper part of the screen. Remaining particles that are 10% of the created particles may move at any initial velocity toward the lower part of the screen.

Figure 5:
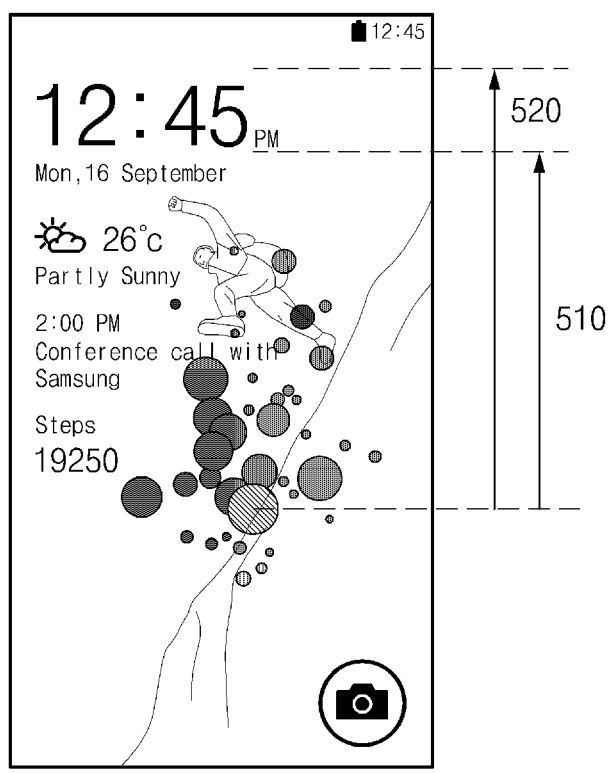
FIG. 5 is an illustration of the travel range of a particle according to an embodiment of the present invention.

FIG. 5 is an illustration of the travel range of a particle according to an embodiment of the present invention.

Referring to FIG. 5, particles move toward the upper part of the screen. The travel of particles may be uniformly performed while maintaining the initial velocity. In an embodiment of the present invention, particles may move as if by gravity to the upper end of the screen. In this case, the moving velocity of particles are accelerated. Also, the travel direction of particles having the initial velocity that move toward the lower part of the screen may also vary at a certain time point to move toward the upper part.

Particles may use various other physical laws in addition to gravity to move toward the upper part of the screen. For example, assuming the screen is a tank of water and the particles are air bubbles, the physical laws regarding buoyancy depending on the size (i.e., volume) of a particle may be simulated. Particles all move toward the upper part of the screen (i.e., the top of the water tank). In this case, particles may have different acceleration depending on their size.

In another example, particles may move as if an electric force was applied. For example, the visual simulation may be an electric field formed from the lower end of the screen to the upper end thereof (i.e., the lower end is a positive (+) plate and the upper end is negative (−) plate) where the particles have + polarity, and thus move toward the upper part of the screen.

As shown in FIG. 5, areas to which the particles may move may be limited. For example, the particles may rise through an area 510 and then stop or fall at any point of an area 520. Alternately, when reaching the upper end of the area 520, particles may disappear even if time remains in their lifecycle.

In another embodiment of the present invention, each particle may move in the actual direction of gravity as sensed by the electronic device or in the direction opposite to gravity instead of towards the upper end of the screen. The electronic device in such an embodiment includes various types of sensors and can sense the direction of gravity by using a gravity sensor. The electronic device may use the sensed direction of gravity to move created particles according to the laws of gravity or a physical law for a virtual force that is applied in the direction opposite to gravity. In the previously discussed example, particles continue to move toward the upper end of the screen even if the electronic device is turned upside down but in the present example, when turning the electronic device in any orientation, the particles will move "down", i.e., toward the source of gravity, regardless of the orientation of the screen.

Figure 6A:
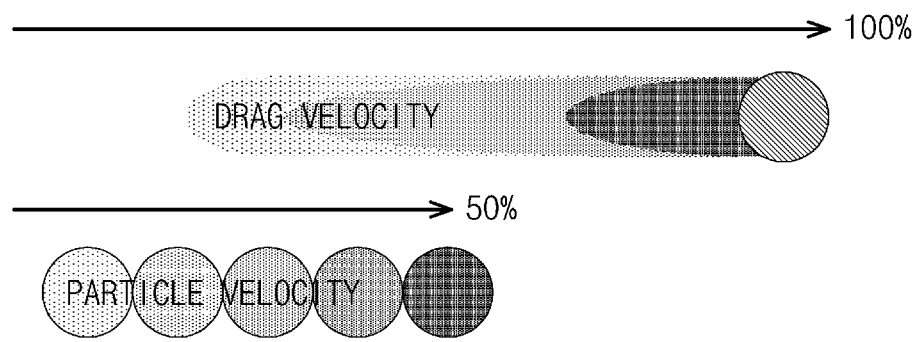
FIGS. 6a and 6b are illustrations of the creation of a particle caused by a drag input according to an embodiment of the present invention.
Figure 6B:
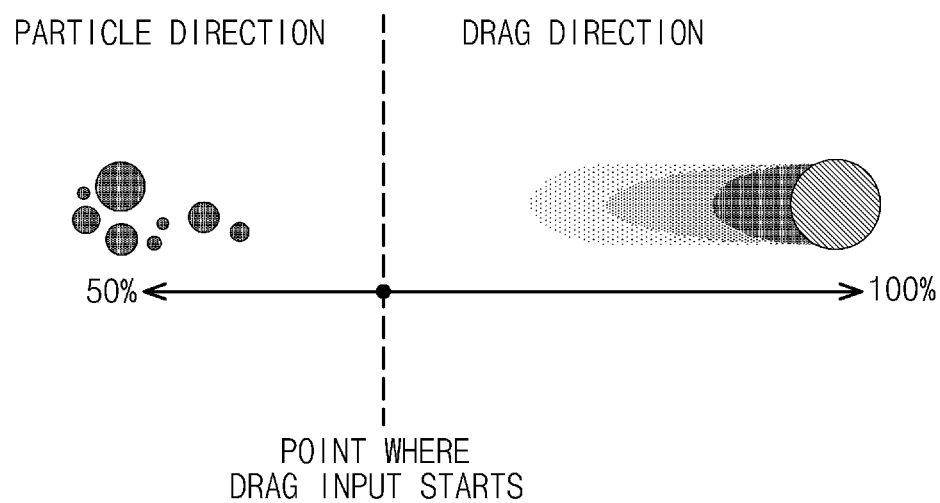

FIGS. 6a and 6b are illustrations of the creation of a particle caused by a drag input according to an embodiment of the present invention.

Referring to FIG. 6a, when a user performs a drag input, the velocity of some of the created particles have a velocity value corresponding to a certain percentage of a velocity at which the drag input moves. For example, when the drag input is received, the electronic device may determine the velocity of the drag input and move generated particles at a velocity corresponding to 50% of a drag input velocity (i.e., V_particle=0.5*V_drag). In this case, the main colors and secondary colors of particles created when the drag input is performed may be determined based on the HSB value of the point over which the user is currently dragging.

Referring to FIG. 6b, some particles move in the direction opposite to a drag direction. That is, particles created in response to the drag input have a speed corresponding to a certain percentage of the drag input velocity and directionality opposite to the drag input velocity.

Figure 7:
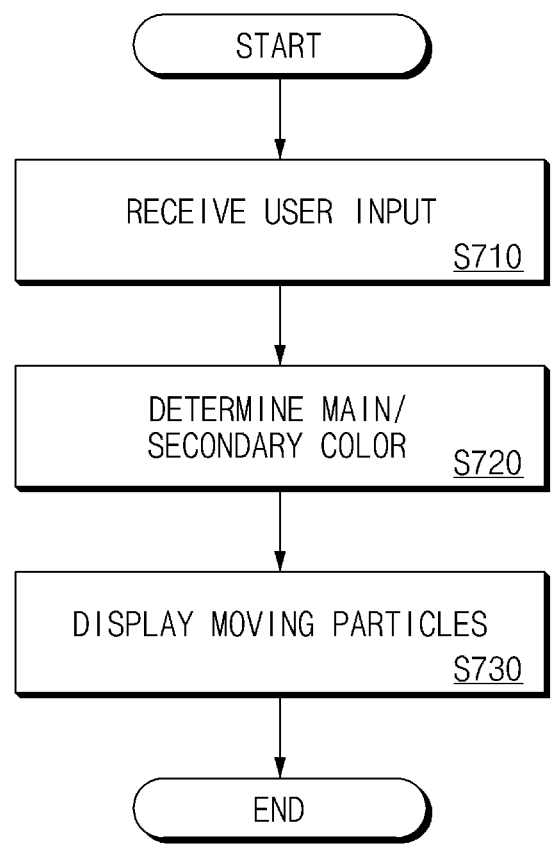
FIG. 7 is a flowchart of a process of displaying a particle effect according to an embodiment of the present invention.

FIG. 7 is a flowchart of a process of displaying a particle effect according to an embodiment of the present invention. Relevant description described above is omitted below.

In step S710, an electronic device receives a user input on a screen. In step S720, the electronic device extracts HSB color information from where the user input is on the screen and determines a main color and a secondary color. In this example, the main color may be the HSB value of the corresponding point and/or area of contact and the secondary color may be another HSB value that is determined based on the HSB value. The hue H values of the main color and the secondary color may be same each other.

In step S730, the electronic device displays a plurality of moving particles. The particles take the user input point/area as the starting point from which they move, and have any colors between the main color and the secondary color. The particles have a certain lifecycle and when the lifecycle lapses, they are destroyed. Regarding the movement of the particles, at least one of the above-described movement related rules is applied.

Figure 8:
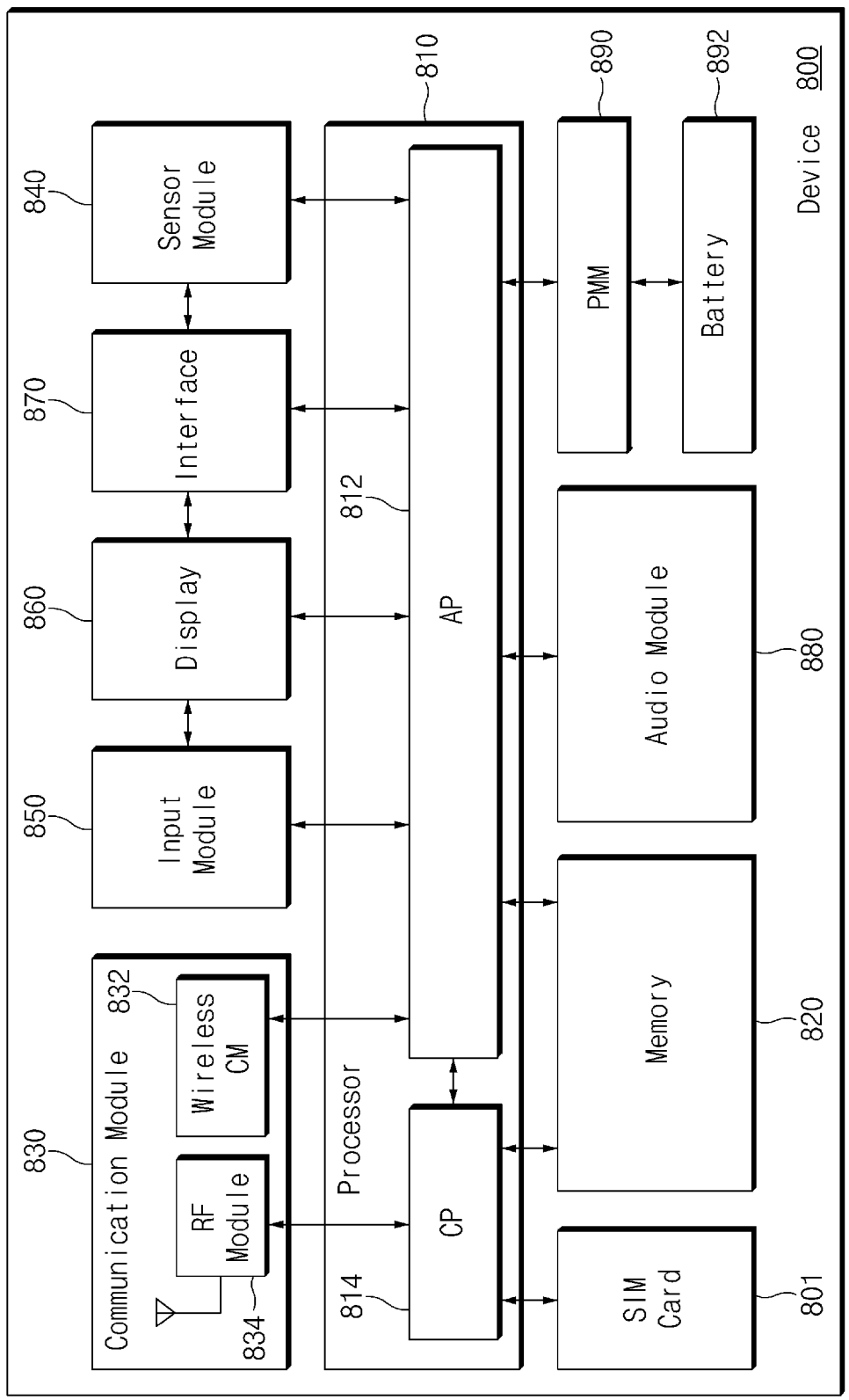
FIG. 8 is a block diagram of an electronic device for providing a particle effect according to an embodiment of the present invention.

FIG. 8 is a block diagram of an electronic device for providing a particle effect according to an embodiment of the present invention.

Referring to FIG. 8, an electronic device 800 includes a processor 810, a memory 820, a communication module 830, a sensor module 840, an input module 850, a display 860, an interface 870, an audio module 880, a Power Management Module (PMM) 890, a battery 892, and a Subscriber Identification Module (SIM) card 801.

The processor 810 includes one or more Application Processors (APs) 812 and/or one or more Communication Processors (CPs) 814. FIG. 8 shows that the AP 812 and the CP 814 are included in the processor 810, but the AP 812 and the CP 814 may be included in different Integrated Circuit (IC) packages, respectively. According to an embodiment of the present invention, the AP 812 and the CP 814 may be included in one IC package.

The AP 812 executes an operating system or application programs to control a plurality of hardware and software components connected to the AP 812 and performs processing and calculation on various pieces of data including multimedia data. The AP 812 may be implanted as a System on Chip (SoC) for example. According to an embodiment of the present invention, the processor 810 further includes a Graphics Processing Unit (GPU).

The CP 814 manages a data link during communicating between other electronic devices connected to an electronic device 800 over a network, and performs a function of converting a communication protocol. The CP 814 may be implanted as a System on Chip (SoC). In an embodiment of the present invention, the CP 814 performs at least some of multimedia control functions. The CP may use a subscriber identification module (e.g., SIM card 801) to identify and authenticate electronic devices in a communication network. Also, the CP 814 may provide voice call, video call, text message and packet data services to a user.

Also, the CP 814 may perform the data transmission/reception of the communication module 830. FIG. 8 shows components including the CP 814, the PMM 890 and the memory 820 separately from the AP 812, but according to an embodiment of the present invention, the AP 812 is implemented to include at least some (e.g., CP 814) of the above-described components.

According to an embodiment of the present invention, the AP 812 or the CP 814 loads, on volatile memories, commands or data received from non-volatile memories connected to the AP 812 or the CP 814 or from at least one of other components, and processes the commands or data. Also, the AP 812 or the CP 814 stores, in non-volatile memories, data received from at least one of other components or generated by at least one of other components.

The SIM card 801 is a card including a subscriber identification module and may be inserted into a slot that is formed on a specific part of an electronic device. The SIM card 801 includes unique identification information (e.g., Integrated Circuit Card IDentifier (ICCID)) or subscriber information (e.g., International Mobile Subscriber Identity (IMSI)).

The memory 820 includes an internal memory and/or external memory. The internal memory includes at least one of a volatile memory such as a Dynamic Random Access Memory (DRAM), Static Random Access Memory (SRAM), or Synchronous DRAM (SDRAM), and a non-volatile memory such as a One Time Programmable Read Only Memory (OTPROM), Programmable Read Only Memory (PROM), Erasable PROM (EPROM), Electrically Erasable PROM (EEPROM), mask Read Only memory (ROM), flash ROM, Not-And (NAND) flash memory, or Not-Or (NOR) flash memory. According to an embodiment of the present invention, the internal memory is a Solid State Disk (SSD). The external memory may further include a flash drive such as a Compact Flash (CF) card, Secure Digital memory (SD) card, micro-SD card, mini-SD card, eXtreme Digital memory (xD) card, or memory stick. The external memory may be functionally connected to the electronic device 800 through various interfaces. According to an embodiment of the present invention, the electronic device 800 further includes a storage device (or storage medium) such as a Hard Disk Drive (HDD).

The communication module 830 includes a wireless communication module 832 and/or a Radio Frequency (RF) module 834. The wireless communication module 832 may include, for example, a Wireless Fidelity (Wi-Fi), Bluetooth, Global Positioning System (GPS), or Near Field Communication (NFC) module. The wireless communication module 832 uses a radio frequency to provide a wireless communication function. Also, the wireless communication module 832 includes a network interface (e.g., a Local Area Network (LAN) card or modem) for connecting the electronic device 800 to a network (e.g., Internet network, LAN, Wide Area Network (WAN), telecommunication network, cellular network, satellite network or Plain Old Telephone Service (POTS)).

The RF module 834 may be responsible for data communication such as the transmission and reception of an RF signal. The RF module 834 may include, for example, a transceiver, Power Amplifier Module (PAM), frequency filter or Low Noise Amplifier (LNA). Also, the RF module 834 may further include a part such as a conductor or wire for transmitting or receiving electromagnetic waves in free space when performing wireless communication. In an embodiment of the present invention, an antenna system may correspond to the RF module 834 or at least a portion of the RF module.

The sensor module 840 measures a physical quantity, senses the operation state of the electronic device 800, and converts measured or sensed information into an electrical signal. The sensor module 840 may include at least one of a gesture sensor, a gyro sensor, an atmospheric pressure sensor, a magnetic sensor, an acceleration sensor, a grip sensor, a proximity sensor, a color sensor (e.g., an RGB sensor), a bio sensor, a temperature/humidity sensor, an illumination sensor and an Ultra Violet (UV) light sensor. Also, the sensor module 840 may include a olfactory sensor, an Electromyography (EMG) sensor, an Electroencephalogram (EEG) sensor, an Electrocardiogram (ECG) sensor, an Infra Red (IR) sensor, an iris sensor or a fingerprint sensor. The sensor module 840 may further include a control circuit for controlling at least one sensor.

The input module 850 includes a touch panel, a digital pen sensor, a key or an ultrasonic input device. The touch panel recognizes a touch input by using at least one of capacitive, pressure-sensitive, infrared or ultrasonic techniques, for example. Also, the touch panel may further include a control circuit. In the case of the capacitive technique, a physical contact or proximity awareness is possible. The touch panel may further include a tactile layer. In this case, the touch panel may provide a tactile response to a user.

The display 860 includes a panel, a hologram or a projector. For example, the panel may be a Liquid Crystal Display (LCD) or an Active Matrix Organic Light Emitting Diode (AMOLED). Also, the panel may be implemented flexibly, transparently or wearably. The panel may be integrated into the touch panel to be configured in a module. The hologram may use the interference of light to display a stereoscopic image in the air. The projector may project light onto a screen to display an image. The screen may be located inside or outside the electronic device 800. According to an embodiment of the present invention, the display 860 may further include a control circuit for controlling a panel, a hologram or a projector.

The interface 870 includes a High Definition Multimedia Interface (HDMI), a Universal Serial Bus (USB), optical communication terminal, or D-subminiature (D-sub) terminal. Also, the interface 870 may include a Mobile High-definition Link (MHL), SD card/Multi-Media Card (MMC) or Infrared Data Association (IrDA) unit.

The audio module 880 converts sound into an electrical signal or vice versa. The audio module 880 may process sound information input or output through a speaker, receiver, earphone, or microphone.

The PMM 890 manages the power of the electronic device 800. The PMM 890 may include a Power Management Integrated Circuit (PMIC), charger IC, or battery or fuel gauge.

An electronic device of the present invention may include all or some of the above-described components. For example, the electronic device may include the processor 810 and a screen for a display. The screen may perform at least one of the functions provided by the input module 850, the display 860 providing a display, the user interface 870, and/or the sensor module 840.

The processor 810 determines a main color and a secondary color, in response to a user input to a point on a screen, based on color information on a corresponding point, and displays a plurality of particles that has any color between the main color and the secondary color, takes the point as a starting point, and moves the plurality of particles.

Also, the electronic device may further include a gravity sensor for sensing the direction of gravity. The processor 810 may determine the travel direction of the particles based on the direction of gravity sensed by the gravity sensor so that the particles move in the direction of gravity or in the direction opposite to gravity.

Figure 9:
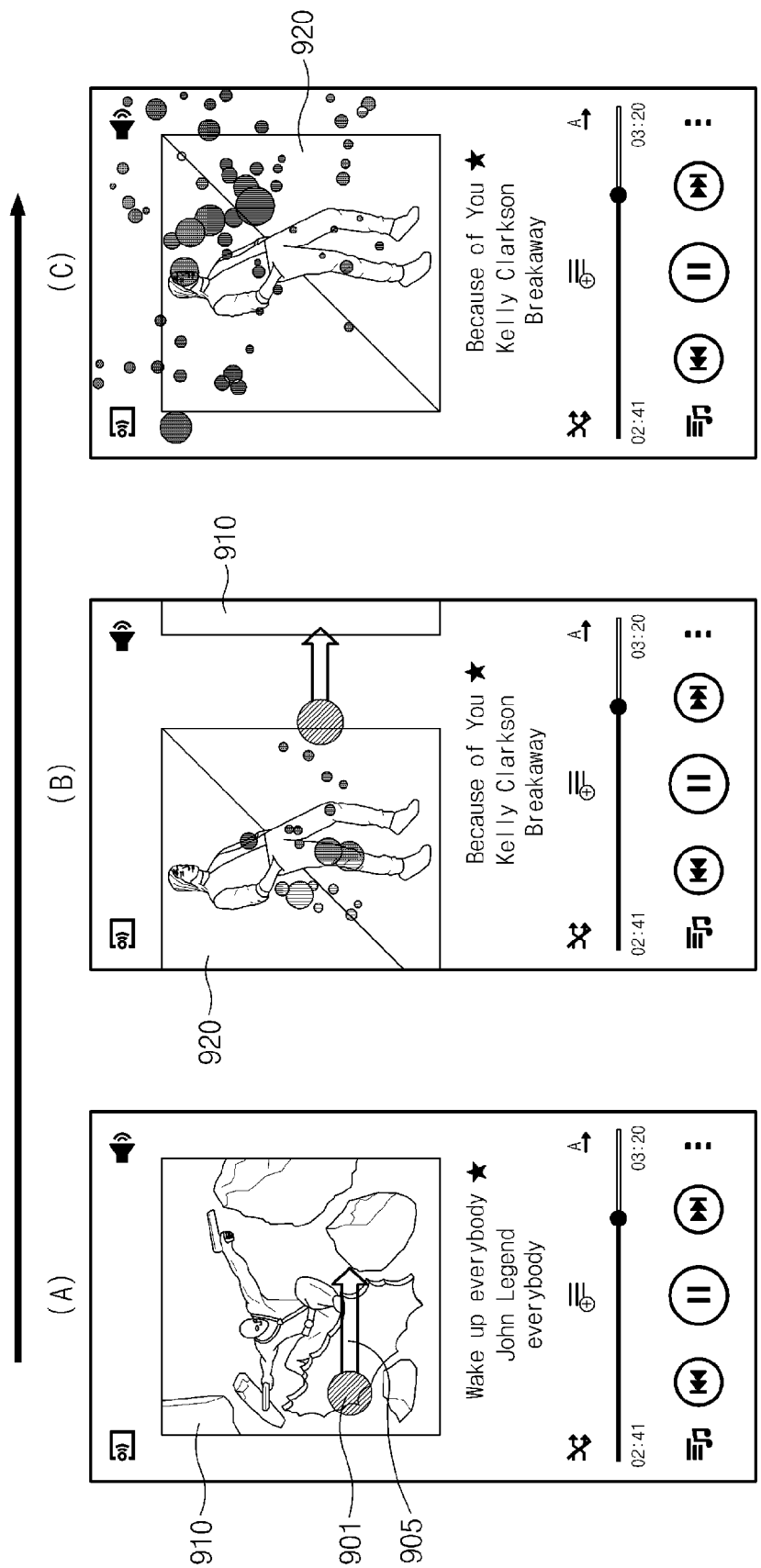
FIG. 9 is an illustration of a particle effect according to an embodiment of the present invention.

FIG. 9 is an illustration of a particle effect according to an embodiment of the present invention. FIG. 9 shows screens changing album art while music plays. When a user touches 901 and drags 905 album art 910 to the right side of the screen of an electronic device, as shown in FIGS. 9 (A) and 9(B), the album art 910 is slid to the right side off of the screen and thus new album art 920 as shown in FIG. 9 (C) may be displayed. In the present embodiment, the album art displayed on the central part of the screen varies by a user's drag input and the color of the created particles varies depending on the color of the point that the user is currently touching. Thus, when the image of displayed album art varies by a slide/drag operation, the electronic device displays a particle effect that matches the color of a changed image.

Figure 10:
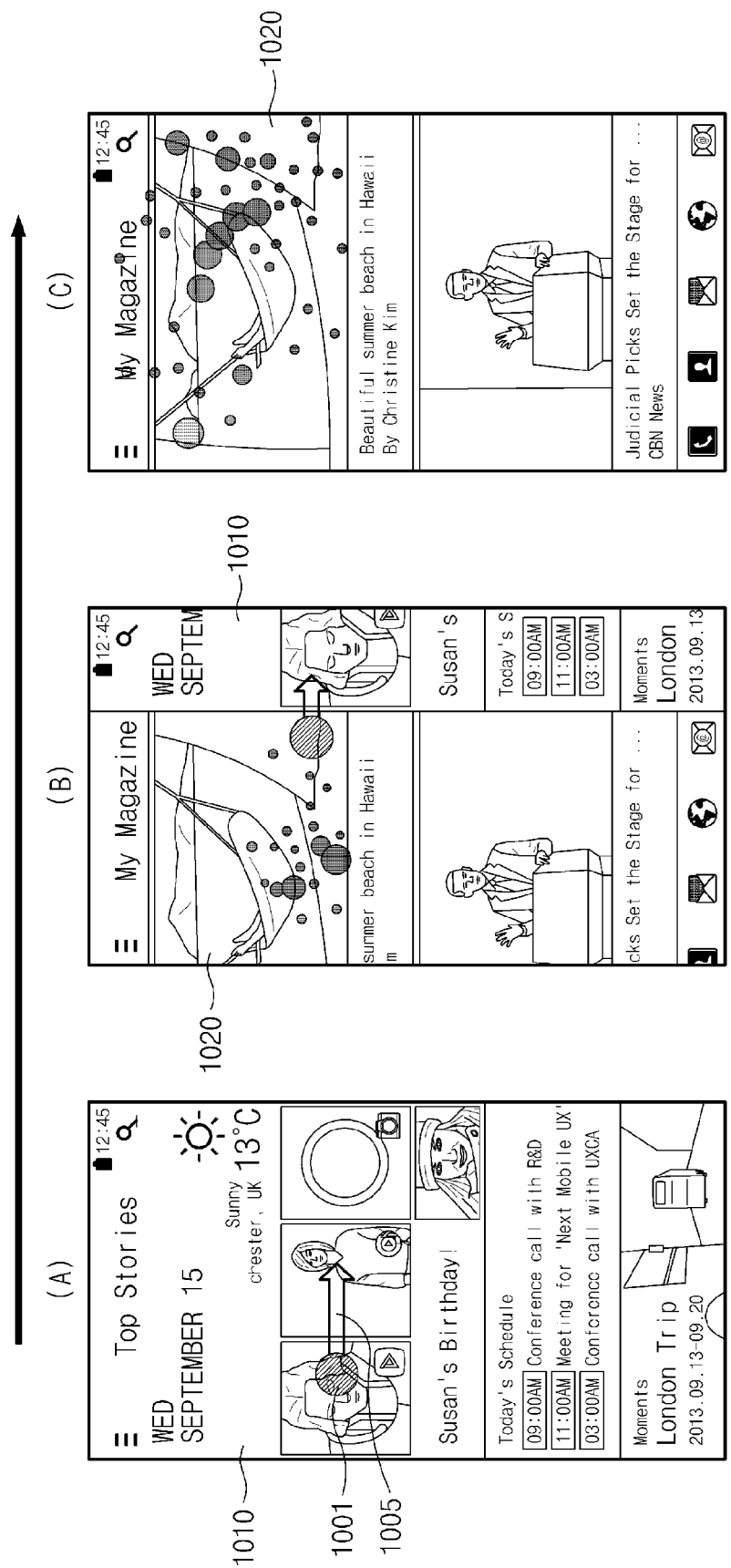
FIG. 10 is an illustration of a particle effect according to another embodiment of the present invention.

FIG. 10 is an illustration of a particle effect according to another embodiment of the present invention. When a user touches 1001 and drags 1005 TOP STORIES screen 1010 to the right side of the screen of an electronic device, as shown in FIG. 10 (A), the entire screen displayed on the electronic device is replaced with new MY MAGAZINE screen 1020 as shown in FIG. 10 (C). As shown in FIG. 10(B), when the user input is performed, particle effects based on the color of the point initially selected by the user first appear and, after the screen is replaced as shown in FIG. 10(C), there are only particle effects based on the color of the new screen.

The particle effect shown in FIG. 10 is an example of the present invention, but the present invention is not limited thereto. For example, although not shown, the particle effect may appear also when a drag input for scrolling a list of contact information or a list of music to play in an application needing a scroll operation is performed.

Each of the above-described elements of the electronic device according to various embodiments of the present invention may include one or more components and the names of corresponding elements may vary depending on the category of an electronic device. The electronic device according to various embodiments of the present invention may include at least one of the above-described elements and some elements may be left out or other elements may be further included. Also, some of the elements of the electronic device according to various embodiments of the present invention are combined to form an entity, which may equally perform the functions of corresponding elements before being combined.

The term "module" used in various embodiments of the present invention may mean a unit including one of hardware, software and firmware, for example or a combination of two or more thereof. The "module" may be interchangeably used with the term "unit", "logic", "logical block", "component", or "circuit", for example. The "module" may be an elementary unit of an integral component or a portion of the elementary unit. The "module" may also be an elementary unit for performing one or more functions or a portion of the elementary unit. The "module" may be implemented mechanically or electronically. For example, the "module" according to various embodiments of the present invention may include at least one of an Application-Specific Integrated Circuit (ASIC) chip, a Field-Programmable Gate Array (FPGA) and a programmable-logic device that performs some operations and has been known or will be developed.

In addition, embodiments disclosed in the specification and the drawings only present examples to easily describe the details of various embodiments of the present invention and help to understand the present invention, and are not intended to limit the scope of various embodiments of the present invention. Thus, it should be construed that all changes or modified forms derived from the technical spirit of various embodiments of the present invention in addition to the disclosed embodiments are included in the scope of various embodiments of the present invention.

What is claimed is:

1. A method for an electronic device, comprising:
   receiving an input on an area on a display screen of the electronic device, the area having at least one color;
   setting, by a processor of the electronic device, a main particle color based on one or more of the at least one color;
   setting, by the processor of the electronic device, a secondary particle color based on the main particle color; and
   generating, by the processor of the electronic device, a plurality of moving particles on the display screen, the moving particles moving around the area, wherein each of the plurality of moving particles has a color on a spectrum from the main particle color to the secondary particle color.

2. The method of claim 1, wherein a shape of the moving particles is at least one of circular, triangular, quadrilateral, star or snowflake shape.

3. The method of claim 1, wherein a shape of the moving particles is three-dimensional.

4. The method of claim 1, wherein a shape of the moving particles based on at least one of a setting and the input.

5. The method of claim 1, wherein a number of moving particles based on at least one of a setting and the input.

6. The method of claim 1, wherein the movement of the moving particles based on at least one of a setting and the input.

7. The method of claim 1, wherein a direction and speed of the moving particles based on at least one of a setting and the input.

8. The method of claim 1, wherein one or more sizes of the moving particles are based on at least one of a setting and the input.

9. The method of claim 1, wherein the plurality of moving particles disappear from the display screen.

10. The method of claim 9, wherein a duration that each of the plurality of moving particles remain on the display screen based on at least one of a setting and the input.

11. The method of claim 1, wherein setting a secondary particle color comprises:
    changing at least one of a hue, saturation, and brightness of the main particle color.

12. The method of claim 1, wherein the color of each of the plurality of moving particles is randomly selected on the spectrum from the main particle color to the secondary particle color.

13. The method of claim 1, wherein the input is a drag or a slide and pluralities of moving particles are continuously generated based on a current location of input on the display screen.

14. The method of claim 1, wherein the input is a drag or a slide and at least one of one or more directions of the moving particles and one or more speeds of the moving particles are based on at least one of the direction and speed of the input.

15. An electronic device comprising:
    a display screen;
    a touch input unit; and
    one or more processors, the one or more processors capable of performing the steps of:
       when an input is received on an area on the display screen, the area having at least one color, setting a main particle color based on one or more of the at least one color;
       setting a secondary particle color based on the main particle color; and
       generating a plurality of moving particles on the display screen, the moving particles moving around the area, wherein each of the plurality of moving particles has a color on a spectrum from the main particle color to the secondary particle color.

16. The electronic device of claim 15, wherein the display screen comprises the touch input unit.

* * * * *